United States Patent
Narayan et al.

(10) Patent No.: US 11,580,301 B2
(45) Date of Patent: Feb. 14, 2023

(54) METHOD AND SYSTEM FOR HYBRID ENTITY RECOGNITION

(71) Applicant: Genpact Luxembourg S.à r.l. II, Luxembourg (LU)

(72) Inventors: Ravi Narayan, Dedham, MA (US); Sunil Kumar Khokhar, Greater Noida (IN); Vikas Mehta, Noida (IN); Chirag Srivastava, Greater Noida West (IN)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 364 days.

(21) Appl. No.: 16/721,452

(22) Filed: Dec. 19, 2019

(65) Prior Publication Data

US 2020/0218856 A1    Jul. 9, 2020

Related U.S. Application Data

(60) Provisional application No. 62/789,751, filed on Jan. 8, 2019.

(51) Int. Cl.
| | |
|---|---|
| *G06F 40/279* | (2020.01) |
| *G06F 40/30* | (2020.01) |
| *G06F 40/253* | (2020.01) |
| *G06F 40/232* | (2020.01) |

(52) U.S. Cl.
CPC .......... *G06F 40/279* (2020.01); *G06F 40/232* (2020.01); *G06F 40/253* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 6,311,152 B1 | 10/2001 | Bai et al. | |
| 7,685,201 B2 | 3/2010 | Zeng et al. | |
| 9,235,812 B2 * | 1/2016 | Scholtes | G06N 20/00 |
| 9,588,960 B2 * | 3/2017 | Nekhay | G06F 40/30 |
| 10,176,802 B1 * | 1/2019 | Ladhak | G10L 19/038 |
| 11,043,214 B1 * | 6/2021 | Hedayatnia | G10L 15/30 |

(Continued)

FOREIGN PATENT DOCUMENTS

JP    2012043048 A  *  3/2012

OTHER PUBLICATIONS

Ravi Narayan, S. Chakraverty and V. P. Singh, (2015) "Quantum Neural Network based Machine Translator for English to Hindi", International Journal of Applied Soft Computing, Elsevier.

(Continued)

*Primary Examiner* — Paras D Shah
(74) *Attorney, Agent, or Firm* — Goodwin Procter LLP

(57) ABSTRACT

A hybrid entity recognition system and accompanying method identify composite entities based on machine learning. An input sentence is received and is preprocessed to remove extraneous information, perform spelling correction, and perform grammar correction to generate a cleaned input sentence. A POS tagger tags parts of speech of the cleaned input sentence. A rules based entity recognizer module identifies first level entities in the cleaned input sentence. The cleaned input sentence is converted and translated into numeric vectors. Basic and composite entities are extracted from the cleaned input sentence using the numeric vectors.

20 Claims, 7 Drawing Sheets

(56) References Cited

U.S. PATENT DOCUMENTS

| | | | |
|---|---|---|---|
| 2003/0208354 A1 | 11/2003 | Lin et al. | |
| 2005/0091031 A1* | 4/2005 | Powell | G06F 40/232 704/4 |
| 2006/0047500 A1 | 3/2006 | Humphreys et al. | |
| 2009/0070325 A1* | 3/2009 | Gabriel | G06F 16/35 707/999.005 |
| 2009/0144609 A1 | 6/2009 | Liang et al. | |
| 2010/0145678 A1 | 6/2010 | Csomai et al. | |
| 2011/0093258 A1* | 4/2011 | Xu | G06F 40/237 704/9 |
| 2011/0222788 A1* | 9/2011 | Tsunokawa | G06F 40/237 382/229 |
| 2014/0163963 A2* | 6/2014 | Dahlmeier | G06F 40/274 704/9 |
| 2019/0180196 A1* | 6/2019 | Terry | G06F 16/34 |
| 2019/0182382 A1* | 6/2019 | Mazza | H04L 51/02 |
| 2019/0188326 A1* | 6/2019 | Daianu | G06F 9/453 |
| 2020/0220832 A1* | 7/2020 | Tada | H04L 51/16 |
| 2021/0326534 A1* | 10/2021 | Wang | G06F 40/295 |

OTHER PUBLICATIONS

Ravi Narayan, V. P. Singh and S. Chakraverty (2014), "Quantum Neural Network Based Machine Translator for Hindi to English", The Scientific World Journal, vol. 2014, Article ID 485737, 8 pages.

Ravi Narayan, V. P. Singh and S. Chakraverty (2014), "Quantum Neural Network based Parts of Speech Tagger for Hindi", International Journal of Advancements in Technology, vol. 5, No. 2, pp. 137-152.

Ravi Narayan, S. Chakraverty and V. P. Singh (2013),"Machine Translation using Quantum Neural Network for Simple Sentences", International Journal of Information and Computation Technology, vol. 3, No. 7, pp. 683-690.

Ravi Narayan, S. Chakraverty and V. P. Singh (2014), "Neural Network based Parts of Speech Tagger for Hindi", Third International conference, Advances and control and Optimisation of dynamical systems, IIT Kanpur, proceedings of IFAC—Elsevier, vol. 3, No. 1, pp. 519-524.

\* cited by examiner

METHOD AND SYSTEM FOR HYBRID ENTITY RECOGNITION

CROSS-REFERENCE TO RELATED APPLICATIONS

The present application claims the benefit of and priority to U.S. Provisional Application Ser. No. 62/789,751, entitled "Method and System for Hybrid Entity Recognition", filed on Jan. 8, 2019, and is hereby incorporated by reference.

FIELD

The present disclosure relates in general to the field of computer software and systems, and in particular, to a system and method for hybrid entity recognition.

BACKGROUND

There are a number of requirements and/or preferences associated with utilizing unstructured data. Dealing with unstructured data is pretty complex, as the unstructured data does not have predefined or pre-structured information. This leads to unpredictable and unsolvable conditions with prior systems.

Typically, unstructured data has a great amount of text (e.g., natural language heavy). It is important to understand the semantics and syntax of that text, in order to determine the various entities and its underlying linguistic cause.

Prior systems may recognize basic level entities (e.g., names of persons, organizations, locations, expressions of times, quantities, etc.) Prior systems are not accurate because they do not determine the context, semantics and syntax at the same time during entity recognition. Prior systems struggle recognizing second level entities (e.g., credit amount and debit amount that are both similar entities that belong to same class "amount").

SUMMARY

A system and method for hybrid entity recognition are disclosed. According to one embodiment, a computer-implemented process, comprises receiving an input sentence. The input sentence is preprocessed to remove extraneous information, perform spelling correction, and perform grammar correction to generate a cleaned input sentence. A POS tagger, tags parts of speech of the cleaned input sentence. A rules based entity recognizer module identifies first level entities in the cleaned input sentence. The cleaned input sentence is converted and translated into numeric vectors. Basic and composite entities are extracted from the cleaned input sentence using the numeric vectors.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

Figure 1:
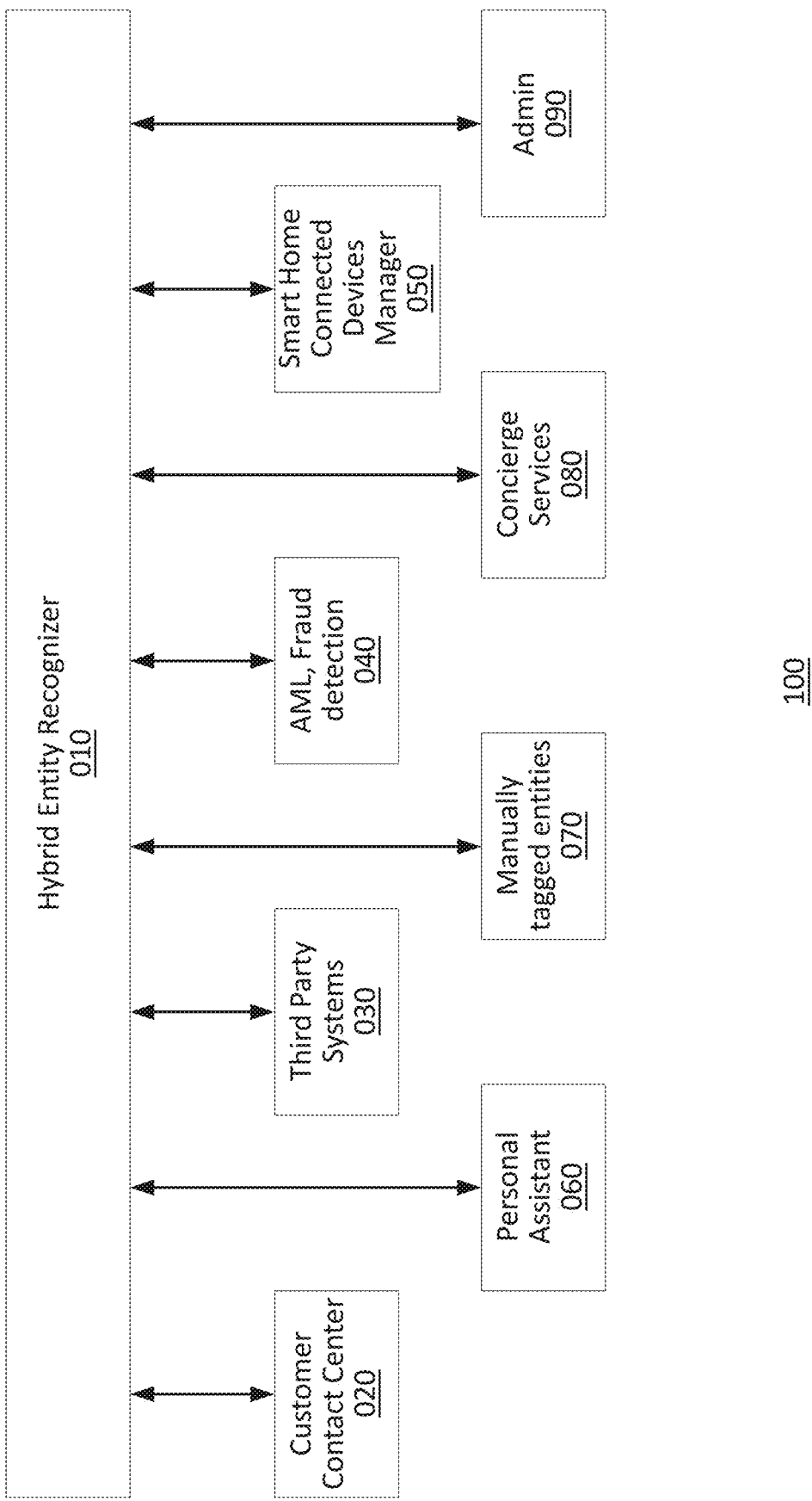
FIG. 1 illustrates a block diagram of an exemplary network of entities with a hybrid entity recognizer (HER), according to one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A system and method for hybrid entity recognition are disclosed. According to one embodiment, a computer-implemented process, comprises receiving an input sentence. The input sentence is preprocessed to remove extraneous information, perform spelling correction, and perform grammar correction to generate a cleaned input sentence. A POS tagger, tags parts of speech of the cleaned input sentence. A rules based entity recognizer module identifies first level entities in the cleaned input sentence. The cleaned input sentence is converted and translated into numeric vectors. Basic and composite entities are extracted from the cleaned input sentence using the numeric vectors.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present hybrid entity recognition (HER) system is useful for any Artificial Intelligence (AI) based expert system. To understand the important entities in any free flow text the AI based expert system requires any entity recognition system, so that based on important entities system can take automatic decision.

The present hybrid entity recognition (HER) system efficiently searches and discovers information using entity recognition. The present HER system finds and implements ways to add structure to unstructured data. This entire process of information extraction and classification of extracted information into pre-determined categories (e.g., names of persons, organizations, locations, expressions of times, quantities, monetary values, percentages, etc.) is known as entity recognition. In addition to pre-determined categories, users may define new categories of entities using a user interface.

The present system determines the context, semantics and syntax of text to identify second level entities also described as composite entities that consist of a base entity with a linguistic pattern (e.g., from city and to city). It also uses memory based linguistic pattern recognition to differentiate between two similar entities of the same class or type (e.g., to date and from date, credit amount and debit account, from city and to city, etc.)

The present hybrid entity recognition (HER) system identifies the entities from a given corpus, stream of abstract raw data, or preprocessed data in text format. The present system is modular and flexible to be implemented with a variety of IT software solutions including semantics (behavioral) systems, question answering systems, ontology computing and opinion mining. The present system has the benefits of:

flexibility, scalability and compatibility with AI systems;
fully complying with microservices architecture e.g., modular, loosely coupled services etc.;
processing entities from text or corpus of data;
recognizing linguistic patterns previously learnt by the system;
learning new entities with minimal effort; and
identifying basic and composite entities which are distinct based on linguistic patterns.

FIG. 1 illustrates a block diagram of an exemplary network of entities with a hybrid entity recognizer (HER) 100, according to one embodiment. Customer contact center 020 may be a call center where the HER system 010 processes queries and responses. Third party systems 030 may be a service desk or help desk for an enterprise organization. Anti-money laundering (AML) and fraud detection systems 040 work with the HER system 010 that processes natural language queries and responses that may include entity lists. Smart home and connected devices managers 050 work with HER system 010 to process language, domain, custom dictionaries, and corpus (e.g., a collection of written texts). Personal assistants (e.g., SIRI, Alexa, Google, etc.) communicate with HER system 010 to process conversational queries and natural language responses. HER system 010 works with manually tagged entities and extracted entities 070. Concierge services 080 works with HER system 010 using natural language queries and responses. Administrative users 090 work with HER system 010 to using decision trees, command center, dictionaries and themes.

Figure 2:
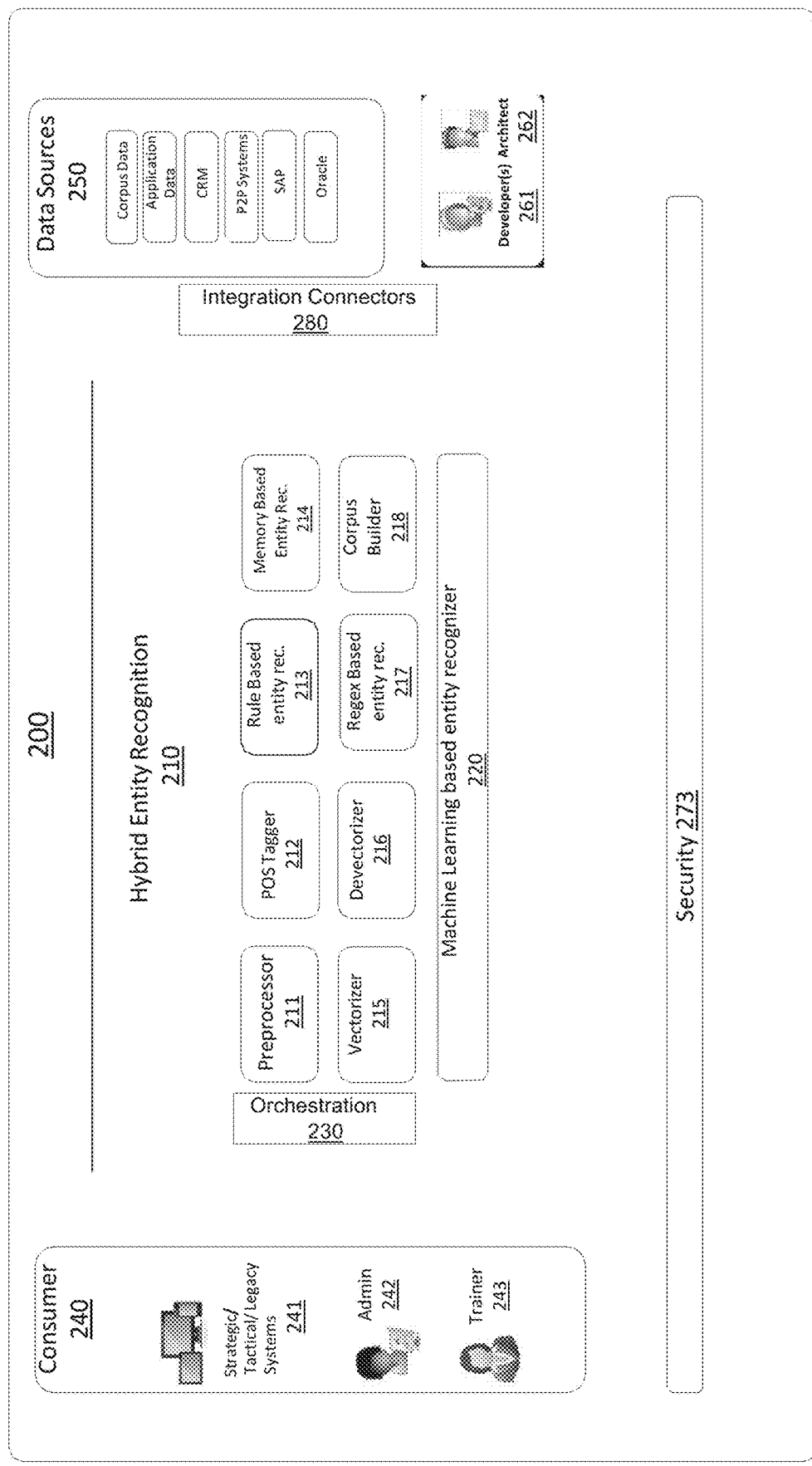
FIG. 2 illustrates an exemplary HER system architecture, according to one embodiment.

FIG. 2 illustrates an exemplary HER system architecture 200, according to one embodiment. System 200 includes HER services 211-218. The preprocessor 211 cleans and massages an input text string (e.g., a sentence), removes extraneous information (e.g., extra spaces, non-useful special symbols, etc.) and performs spelling correction and grammar corrections. For example, if the input sentence is "'My bank aacount number is 70318XXXX and want bank statement from Dec. 11, 2017 to Dec. 5, 2018" then the output of preprocessor would be "My bank account number is 70318XXXX and want bank statement from Dec. 11, 2017 to Dec. 5, 2018."

The Parts of Speech (POS) tagger 212 assigns parts of speech to each word. There are eight parts of speech in the English language: noun, pronoun, verb, adjective, adverb, preposition, conjunction, and interjection. The part of speech indicates how the word functions in meaning as well as grammatically within the sentence. POS Tagger 212 provides tags such as "He [PRON] lives [VERB] in [Preposition] USA [NOUN]."

The rules based entity recognizer 213 recognizes an entity at very first level (e.g., a first level entity) based on pre-defined linguistic rules and corpus/dictionaries, where the corpus contains a list of names of persons, organizations, locations, etc. For example, the rules based entity recognizer 213 identifies a word as a name when the word is identified as a noun by the POS tagger 212 that is also available in a dictionary of names.

The memory based entity recognizer 214 recognizes composite entities such as the "to date", "from date", "to location", and "from location." Memory based entity recognizer 214 uses the first level entities identified by the rules based entity recognizer 213 and machine learning based entity recognizer 220 to recognize the composite entities that include a base entity with a linguistic pattern (e.g., from city and to city). The memory based entity recognizer module 214 has the capability to learn linguistic patterns and store the linguistic patterns, base entity information, key word and its relative proximity to the base entity, in memory for future entity recognition processes.

The RegEx (regular expression) based entity recognizer 217 and rules based entity recognizer 213 recognizes the entity at a first level based on a predefined word structure, and linguistic rules (e.g., USD200 or $200 or any date, etc.).

The vectorizor 215 used in the present HER system 210 converts and translates text into numeric vectors used by the sequence classification machine learning algorithm, which is based on a back propagation neural network. Sequence-to-sequence prediction involves predicting an output sequence given an input sequence. Sequence prediction predicts elements of a sequence on the basis of the adjacent elements. The sequence-to-sequence classifier is a type of neural network that is trained using a back-propagation method that fine-tunes the weights of the neural network based on the error rate obtained in the previous epoch (e.g., iteration). A sequence to sequence model maps a fixed-length input with a fixed-length output where the length of the input and output may differ, for example:

Step 1: Input Sentence: "James lives in USA"
Step 2: Vectorization: convert input sentence into a numeric vector
Step 3: Sequence-to-sequence classification: Pass numeric vectorized sequence to sequence classifier
Step 4: Devectorization: Devectorize the numeric sequence received from the classifier
Step 5: Output: "[Name]$_{James}$ [none]$_{lives}$ [none]$_{in}$ [Country]$_{USA}$."

The vectorizer 215 preserves the POS information of individual words in a sentence, the number of occurrences of any POS in the sentence, and the entity information recognized by the rules based entity recognizer 213. The vectorizer 215 uses a hash table to assign the numeric value to every word's POS as POSbaseid. The vectorizer's numerical representation is given below:

Vector=f (POSbaseid, Occurrence Number,Rulebase Entity Class id)

The devectorizer 216 performs the opposite process of the vectorizer 215 to reconvert the output of a machine learning model (which would be in the form of a vector) to meaningful text with a clear identification of entities in the text (e.g. names of persons, organizations, locations, expressions of times, quantities, etc.).

The corpus data contains predefined entities like Person Name, County Name, City Name, etc. The corpus builder 218 uses memory based learning to add new entities to the corpus over time with additional training.

Data sources 250 may include corpus data, application data, CRM, P2P systems, SAP, and Oracle. The corpus data contains predefined entities like Person Name, County Name, City Name, etc. The present system 200 can be connected with any of the above mentioned systems to utilize existing information, which can be used in the form of pre-defined entities.

The present system 200 adheres to SSL level security protocols 273. As an enterprise level application, the present system 200 adheres to the available security protocols and requirements of the enterprise system within which it operates.

The present system 200 has capabilities that relate to API specifications to which it interfaces (e.g., microservices). These capabilities include being small in size, messaging-enabled, autonomous and being independently deployable. A microservice is not a layer within a monolithic application. Some of the benefits of microservice based APIs are:

- Modularity: This makes the present system 200 easier to understand, develop, test, and become more resilient to architecture erosion.
- Scalability: Because microservices are implemented and deployed independently of each other (e.g., they run within independent processes), they can be monitored and scaled independently.
- Integration of heterogeneous and legacy systems: microservices can be used to modernize existing monolithic software applications.
- Distributed development: Teams develop, deploy and scale their respective services to independently parallelize development. Microservices allow the architecture of an individual service to emerge through continuous refactoring. Microservice-based architectures facilitate continuous delivery and deployment.

Multiple types of consumers 240 can consume these microservices using orchestration 230. The orchestration layer 230 controls and manages the communications between HER services 211-218. The orchestration layer 230 contains a directory of services along with a listing of its capabilities. Based on the type of request and business logic, the orchestration layer 230 manages the communication between the HER services 211-218. Communication between the HER services 211-218 uses JavaScript Object Notation (JSON). Typically, a consumer 240-243 sends text in the form of a request in JSON object for entity recognition and orchestration layer 230 returns the list of extracted entities, as shown below:

def get_all_entities_service(input_sentence<JSON>, Return_all_entities_list<JSON>)

Example values of input and output parameters include:
Input_Sentence: "James lives in USA"<pass as JSON Object>
Return_all_entitie_list: "[Name]$_{James}$ [none]$_{lives}$ [none]$_{in}$ [Country]$_{USA}$." <get as JSON>

Integration connectors 280 connect the present system 200 with different data sources 250, such as a database, CRM, P2P systems, SAP, Oracle, etc. Integration connectors 280 include driver libraries, such as JDBC driver, ODBC driver, SAP JDBC driver, etc. Integration connectors 280 use these drivers to make and establish the connection between the HER system 210 and datasource 250.

Figure 3:
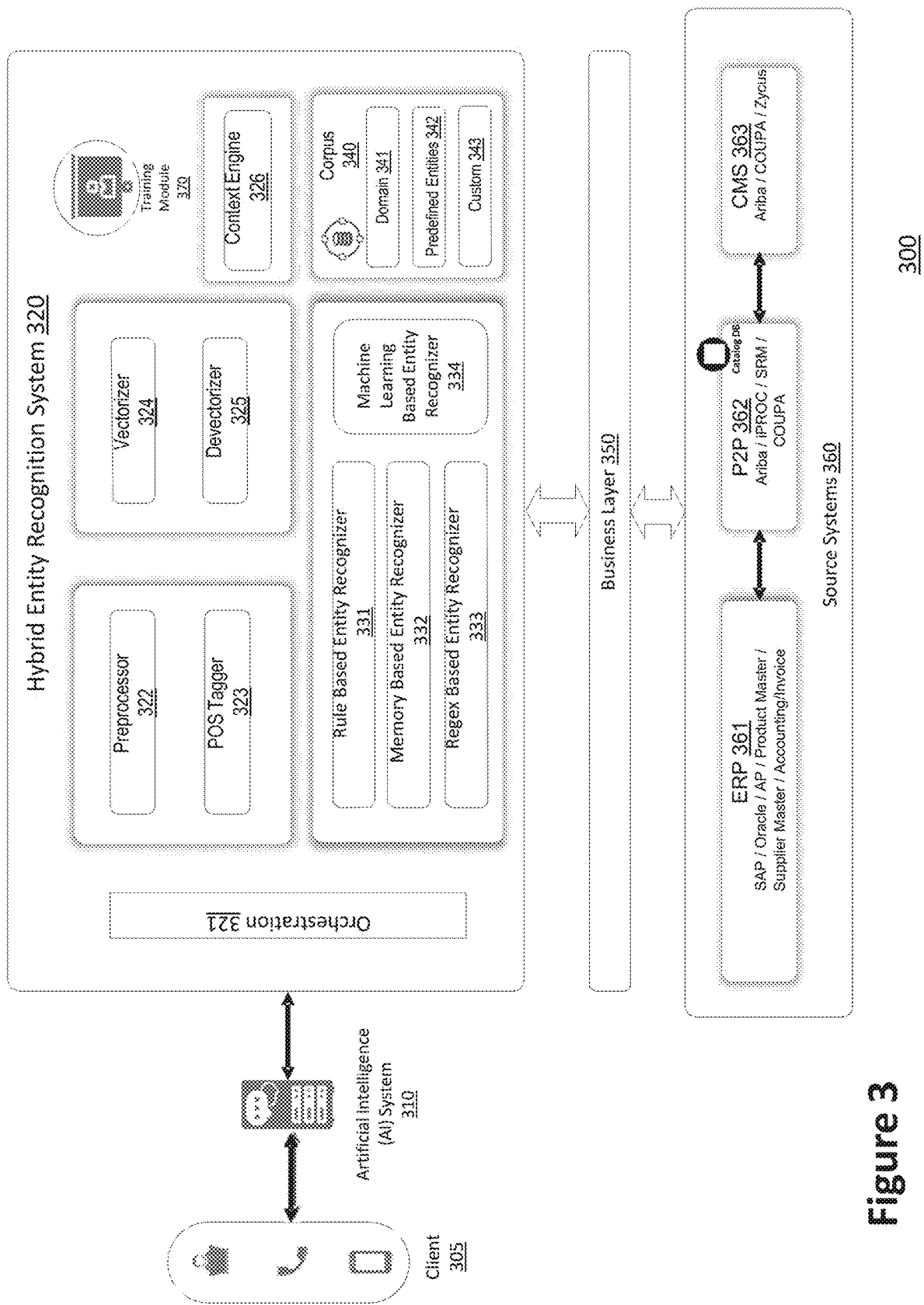
FIG. 3 illustrates an exemplary HER system architecture, according to another embodiment.

FIG. 3 illustrates an exemplary HER system architecture 300, according to another embodiment. Components in FIG. 3 that are shared with the HER system 200 of FIG. 2 operate as described above. The context engine 326 keeps the context of up to three levels to identify the appropriate entity in the sentence. The context is used to identify the indirect entities addressed by pronoun like he, she, it, etc. For example, consider the sentence "I am working with Genpact and I want to know its last year performance numbers." In this sentence the context engine 326 identifies that the subject is Genpact and in the second portion of that sentence "its" means Genpact. The rule based entity recognizer 331 recognizes "its" as Genpact.

The training module 370 trains a machine learning model and memory learning model with new datasets, when a user feeds the data to the HER system 320. The HER system 320 identifies the tagged entities, which are identified by the rule based entity recognizer 331 and RegEx based entity recognizer 333. The user may make corrections, tag the untagged entities and then perform the training using the User Interface of the training module 370. Using the training module 370 a user may introduce new types of basic entities and composite entities.

As an enterprise level application, the present HER system 200 interacts with business layer 350. Business layer 350 is an intermediate layer between the HER system 320 and the external source systems 360 (e.g., a legacy enterprise system). The business layer 350 has business logic and rules. A business logic or rule can be represented as:

If <condition(s)> Then <consequence(s)>
When <condition(s)> Then <imposition(s)> Otherwise <consequence(s)>

In system 300, the business logic/rules of business layer 350 provides domain specific knowledge. For example, in the banking domain, the meaning of "card" is a credit card or a debit card. In electronics engineering the meaning of "card" is a PCB (Printed Circuit Board). As another example of a business rule, the word "net" in the financial domain has the meaning of gross. However, in the fishing industry the meaning refers to a fish net. In the IT domain the meaning of "net" is Internet.

The business layer 350 contains business rules. The external source systems 360 (e.g., ERP, P2P, CMS systems) use business layer services 350 to display data, or to consume data. The business rules provide data used by the external source systems 360.

The source systems 360 are systems that are the consumers to HER system 320. Any consumer source system 360 (e.g., ERP, P2P, CMS systems) sends the request along with the text/sentence in JSON format to HER system 320 for entity extraction/recognition.

Artificial intelligence (AI) system 310 can utilize the HER system 200 to capture the important information in the form of entities from Natural language/free flow text. AI systems artificially mimic human intelligence processes, including self-learning, reasoning. These processes include learning (the acquisition of information and rules for using the information), reasoning (using rules to reach approximate or definite conclusions) and self-correction. Particular applications of AI include expert systems, speech recognition and machine vision.

In system 300, the client 305 may be a human consumer of HER system 320, who may be a trainer, developer or user, interacting directly with the system or through the mobile device or Interactive Voice Response (IRV) system. To manage the communication between the HER services 211-218, the orchestration layer 321 controls and manages the communication between all the internal HER services. The orchestration layer 321 contains a directory of services along with a listing of the service's capabilities. For example, some of the services may be:

```
def    get_preprocessor_service(input_sentence<JSON>,
    Return_processed_sent<JSON>)
def    get_pOStagger_service(input_sentence<JSON>,
    Return_tagged_Sentence<JSON>)
def    get_vectorizer_service(input_sentence<JSON>,
    Return_vector<JSON>)
def    get_vectorizer_service(input_sentence<JSON>,
    Return_vector<JSON>)
def    get_vectorizer_service(input_vector   <JSON>,
    Return_sentence r<JSON>)
```

Based on the type of request and the business logic/rules, orchestration layer 321 manages communications between the HER services 322-334, where according to one embodiment the communications use the JSON format. Predefined business logic/rules determine the sequence that orchestration layer 321 calls HER services 322-334 in order to provide extracted basic and composite entities.

A custom corpus 343 provides the flexibility to store metadata and data of user defined entities. While new entity or custom entity training, the system 320 captures that entity and stores the entity into custom corpus 343. For example, a business requirement may be that a designation such as CTO, CDO, VP, AVP, and SM should be recognize as a designation. Then during learning the HER system 320 stores all these custom words into custom corpus 343.

Figure 4:
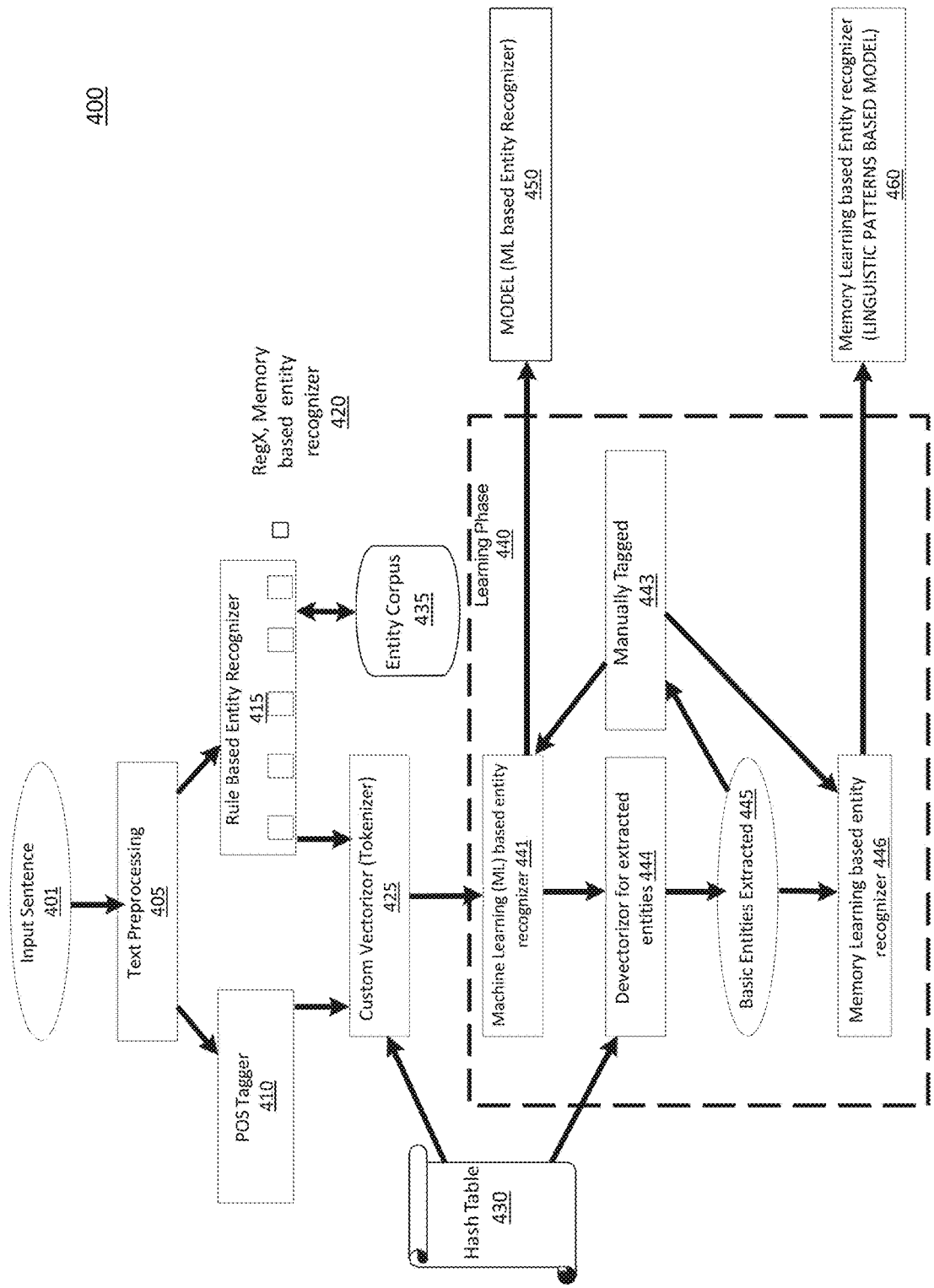
FIG. 4 illustrates an exemplary HER system process for learning, according to one embodiment.

FIG. 4 illustrates an exemplary HER system process for learning 400, according to one embodiment. The learning phase of the system utilizes the processing modules to process/learn the sentences with the selected entities in it by the user. As shown in FIG. 4 the text preprocessing module 405 cleans and massages the input text, string, or sentence 401. The preprocessor 405 removes extra spaces, and other non-useful special symbols. The preprocessor 405 performs spelling correction and grammar corrections to the input text, string, or sentence.

Then the cleansed sentence is passed to the POS Tagger 410, as well as to the rules based entity recognizer 415. The POS tagger module 410 tags the POS for each word of the input text 401. The rules based entity recognizer 415 identifies the first level entities in the input text 401. Then the output of both the POS tagger 410 and rules based entity recognizer modules 415 is passed to the vectorizer 425, which combines these outputs and creates/translates the input sentence 401 into the form of a vector representation that is further used by the machine learning based entity recognizer module 441 for training (e.g., the machine learning model generated based on manually tagged data and entities 443 tagged by the rules based entity recognizer 415.

Manually tagged data is used as training data. Manually tagged data contains the words of an input sentence and the tags for the individual words as tagged manually. The machine learning based entity recognizer module learns based on the manually tagged data. For example, consider the input sentence "My bank account number is 70318XXXX and want bank statement from Dec. 11, 2017 to Dec. 5, 2018." All the entities available in this example sentence are tagged (e.g, 70318XXXX, Dec. 11, 2017 and Dec. 5, 2018).

The vectorizor 425 and vectorizer 444 process use hash table 430 that contains the base numeric code of entity tag set. The hash table 430 contains the tag set based on the numbering on the list of entities and parts-of-speech (e.g., a tag set may be noun, pronoun, adverb, verb, helping verb, etc.). Every entity in a tag set is given a numeric code, which is used to generate the vector or to transform the vector into tagged entities. For example:

Input Sentence: He$_{[Pro\ Noun]}$ is$_{[Helping\ Verb]}$ Tom$_{[Noun]}$ Using the Hash Table POSBase id of "Noun" is 0.10 and occurrence number is 2.

Entity id of Tom is 10 by using Hash Table: Entity Class by using the equation:

Vector=f(POSbaseid,Occurrence Number,Rulebase Entity Class id)

Vector$_{[Tom]}$=f(0.10, 2, 10)=>0.10110

The vectorizor 425 preserves the POS information of individual words in a sentence, the number of occurrences of any POS in the sentence, and the entity information recognized by the rules based entity recognizer 415. The vectorizer 425 uses hash table 430 to assign the numeric value to every word's POS as POSbaseid. The vectorizer's numerical representation is:

Vector=f(POSbaseid,Occurrence Number,Rulebase Entity Class id)

The devectorizer 444 performs the opposite process of the vectorizer 425 to reconvert the output of a machine learning model (which would be in the form of a vector) to meaningful text with a clear identification of entities in the text (e.g., names of persons, organizations, locations, expressions of times, quantities etc.) and identified entities store into the base entities 445 extracted. The base entities extracted 445 feed into memory learning based entity recognizer 446 to recognize composite entities. The present system 200 uses memory based learning to create and learn computational linguistics based patterns, (e.g., to date and from date, credit amount and debit account, from city and to city, etc.)

The RegEx (regular expression) based entity recognizer 420 recognizes the entity based on a predefined word or character level structure as a regular expression (e.g., USD200 or $200 or any date, etc.).

This information is used as feedback to the machine learning model and memory learning based linguistic patterns module to learn new first level entities, as well as composite entities. After this feedback and training process the present HER system 300 generates two models, e.g., a machine learning model 460, and a memory learning based linguistic patterns module model 450. These models can be used to recognize the entities from the text that will be analyzed by the HER system 300 after the learning phase is completed. During the training process if the user wants to train the HER system 300 for composite entities, the system uses memory based learning to create and learn computational linguistics based patterns, to recognize composite entities (e.g., to date and from date, credit amount and debit account, from city and to city, etc.)

Figure 5A:
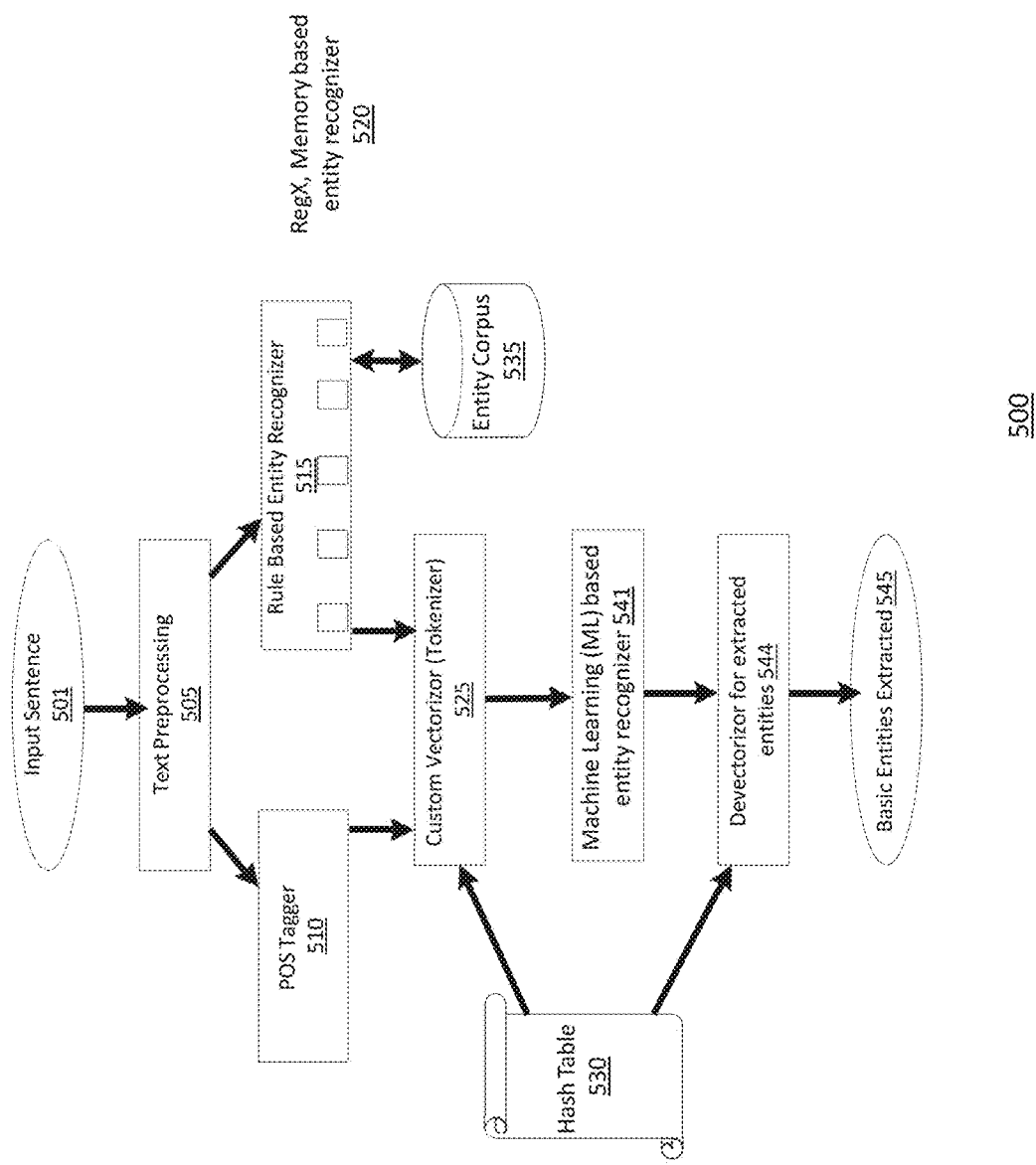
FIGS. 5a and 5b illustrate an exemplary HER system process for recognizing and extracting entities, according to one embodiment.
Figure 5B:
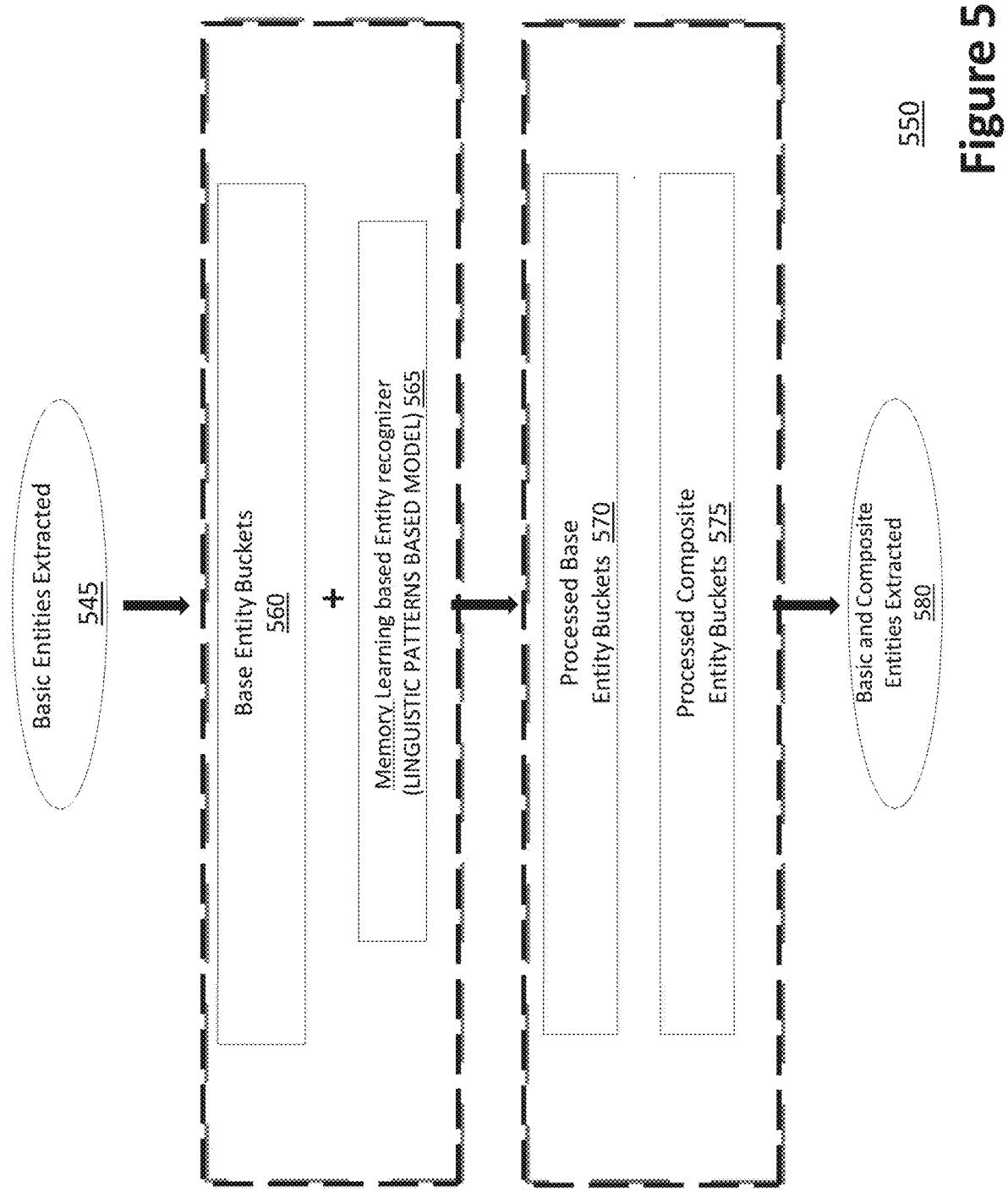

FIGS. 5a and 5b illustrate an exemplary HER system process for recognizing and extracting entities, according to one embodiment. This hybrid approach uses machine learning, memory learning and a rules based system to recognize entities from the given sentences, it also uses the POS. The present system 300 learns new entities from the text. After the learning phase is complete the HER entity recognition modules shown in FIG. 5a operate as described above with FIG. 4. The process and modules are similar to the HER learning phase 400, except that the machine learning model 541 as shown in FIG. 5a, the machine learning model recognizes the entities from new text being presented to and processed by the present HER system 300.

HER system 300 has an entity corpus 535 that contains the metadata and data of pre-defined entities (e.g., names of persons, organizations, locations, expressions of times, quantities, etc.) HER system 300 finds and matches the predefined entities using the entity corpus 535.

The extracted entities are stored in entity bucket 560. Entity bucket 560 is the mechanism used to store the base entities temporarily for further processing. After being stored in entity bucket 560, the composite entities are extracted using memory learning and linguistic pattern based models 565. Then the base entities and extracted composite entities are stored into processed base entity buckets 570 and processed composite entity buckets 575, respectively.

Both the learning and run-time phases use Statistical Machine Learning (SML) and Memory Based Learning (MBL) that work on linguistic or lexical patterns. The present system 300 extracts entities from any given text input(s) and learns new entities. The present system 300 uses a hybrid approach that leverages machine learning 334 for extracting the base entities and a memory based entity recognizer 332 for extracting the linguistic pattern based composite entities (e.g., to date and from date, credit amount and debit account, from city and to city, etc.)

Figure 6:
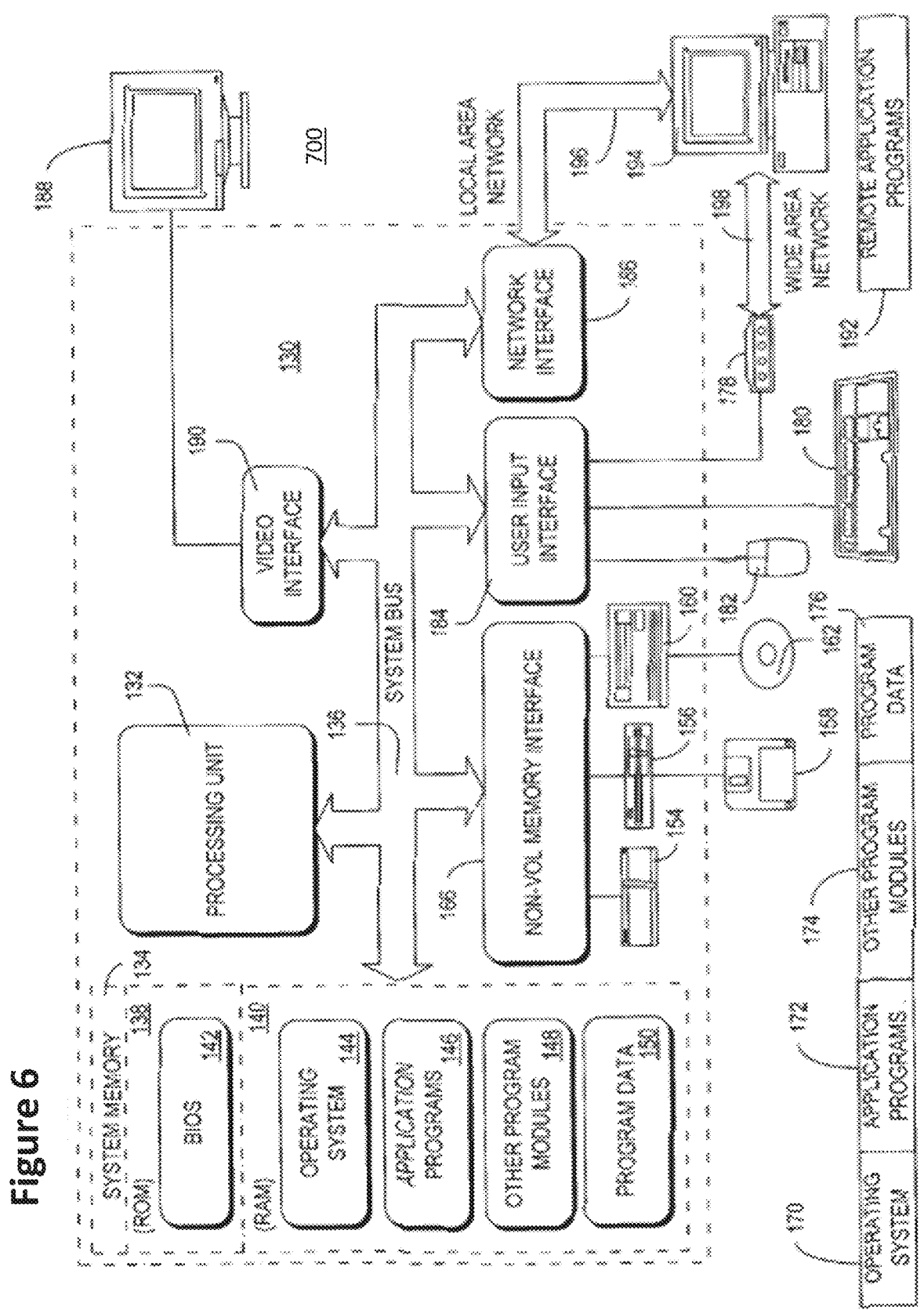
FIG. 6 shows an exemplary general purpose computing device in the form of a computer, according to one embodiment.

The present HER system 300 may be used with any Artificial Intelligent (AI) System and Automation System 310. The following is a list of technology applications for the present HER system:
Personal Assistants
Expert Q&A systems
Domain Specific Expert Assistants
Service Desk/Help Desk
Customer Contact Center
Outbound for Data Gathering
AML, Fraud (Risk) detection
Sales of low involvement Products
Smart Home/Connected Devices Manager
Concierge Services FIG. 6 shows an exemplary general purpose computing device in the form of a computer 130, according to one embodiment. A computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 144, and magnetic disk drive 156 and optical disk drive 160 are typically connected to the system bus 136 by a nonvolatile memory interface, such as interface 166.

The drives or other mass storage devices and their associated computer storage media discussed above, provide storage of computer readable instructions, data structures, program modules and other data for the computer 130. Hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 194, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed using instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purposes or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

While the present disclosure has been described in terms of particular embodiments and applications, summarized form, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the scope of the present disclosure.

What is claimed is:

1. A computer-implemented process, comprising:
receiving an input sentence;
preprocessing the input sentence to generate a cleaned input sentence;
tagging parts of speech of the cleaned input sentence;
identifying first level entities in the cleaned input sentence;
converting and translating the cleaned input sentence into numeric vectors based on identifying the first level entities, wherein one of the numeric vectors includes at least a number of occurrences of a part of speech in the cleaned input sentence;
creating a first training set comprising the numeric vectors and the tagged parts of speech;
training a first machine learning model using the first training set to identify basic entities;
creating a second training set based on the tagged parts of speech and the basic entities;
training a second machine learning model using the second training set; and
extracting composite entities from the cleaned input sentence based on the second machine learning model and using the numeric vectors, wherein one of the composite entities includes at least a first level entity with a linguistic pattern.

2. The computer-implemented process of claim 1, wherein the first level entities include one or more of Company, Name, Currency, City, Social Security Number, State, E-Mail Address, Product, Contact, and Postal Index Number (Pin) Code.

3. The computer-implemented process of claim 1, wherein the composite entities include one or more of To Date, From Date, Promo Amount, and Payment Account.

4. The computer-implemented process of claim 3, wherein the composite entities are extracted from the cleaned input sentence using a memory based linguistic pattern recognizer.

5. The computer-implemented process of claim 1, wherein extracting the composite entities from the cleaned input sentence uses one or more of machine learning, memory based learning, computational linguistics and custom rules.

6. The computer-implemented process of claim 1, wherein the operations further comprise identifying indirect entities addressed by pronouns based on context of the cleaned input sentence.

7. The computer-implemented process of claim 1, wherein the operations further comprise learning linguistic patterns and storing one or more of the linguistic patterns, information of the first level entities, keywords, and relative proximity information of one of the keywords to one of the basic entities.

8. A system, comprising:
  a preprocessor that receives an input sentence and processes the input sentence to generate a cleaned input sentence;
  a POS tagger that tags parts of speech of the cleaned input sentence;
  a rule based entity recognizer that identifies first level entities in the cleaned input sentence;
  a vectorizer that converts and translates the cleaned input sentence into numeric vectors based on identifying the first level entities, wherein one of the numeric vectors includes at least a number of occurrences of a part of speech in the cleaned input sentence;
  a machine learning based entity recognizer that creates a first training set comprising the numeric vectors and the tagged parts of speech and trains a first machine learning model using the first training set to identify basic entities; and
  a memory based entity recognizer that creates a second training set based on the tagged parts of speech and the basic entities, trains a second machine learning model using the second training set, and extracts composite entities from the cleaned input sentence based on the second machine learning model and using the numeric vectors, wherein one of the composite entities includes at least a first level entity with a linguistic pattern.

9. The system of claim 8, wherein the first level entities include one or more of Company, Name, Currency, City, Social Security Number, State, E-Mail Address, Product, Contact, and Postal Index Number (Pin) Code.

10. The system of claim 8, wherein the composite entities include one or more of To Date, From Date, Credit Amount, Debit Amount, Promo Amount, Payment Account, From address, To address, Sender's Address, and Receiver's Address.

11. The system of claim 10, wherein the composite entities are extracted from the cleaned input sentence using a memory based linguistic pattern recognizer.

12. The system of claim 8, wherein extracting the composite entities from the cleaned input sentence uses one or more of machine learning, memory based learning, computational linguistics and custom rules.

13. The system of claim 12, further comprising a context engine that identifies indirect entities addressed by pronouns based on context of the cleaned input sentence.

14. The system of claim 8, wherein the memory based entity recognizer learns linguistic patterns and stores one or more of the linguistic patterns, information of the first level entities, keywords, and relative proximity information of one of the keywords to one of the first level entities.

15. The system of claim 8, wherein identifying the basic entities is also based on reconverting a vector into text representing identification of the basic entities.

16. The system of claim 8, further comprising a regular expression based entity recognizer that communicates with the rule based entity recognizer to identify the first level entities based on word structures and linguistic rules.

17. The system of claim 8, further comprising an artificial intelligence system.

18. The system of claim 8, further comprising data sources including one or more of corpus data, application data, customer relationship management (CRM) data, or peer-to-peer (P2P) systems data.

19. The system of claim 8, further comprising a security layer that provides secure sockets layer (SSL) security.

20. The system of claim 8, further comprising a business layer that provides domain specific knowledge used for identifying the basic entities and composite entities.

* * * * *